July 4, 1950 R. M. NARDONE 2,513,734
ENGINE ACCESSORY
Filed Aug. 5, 1946
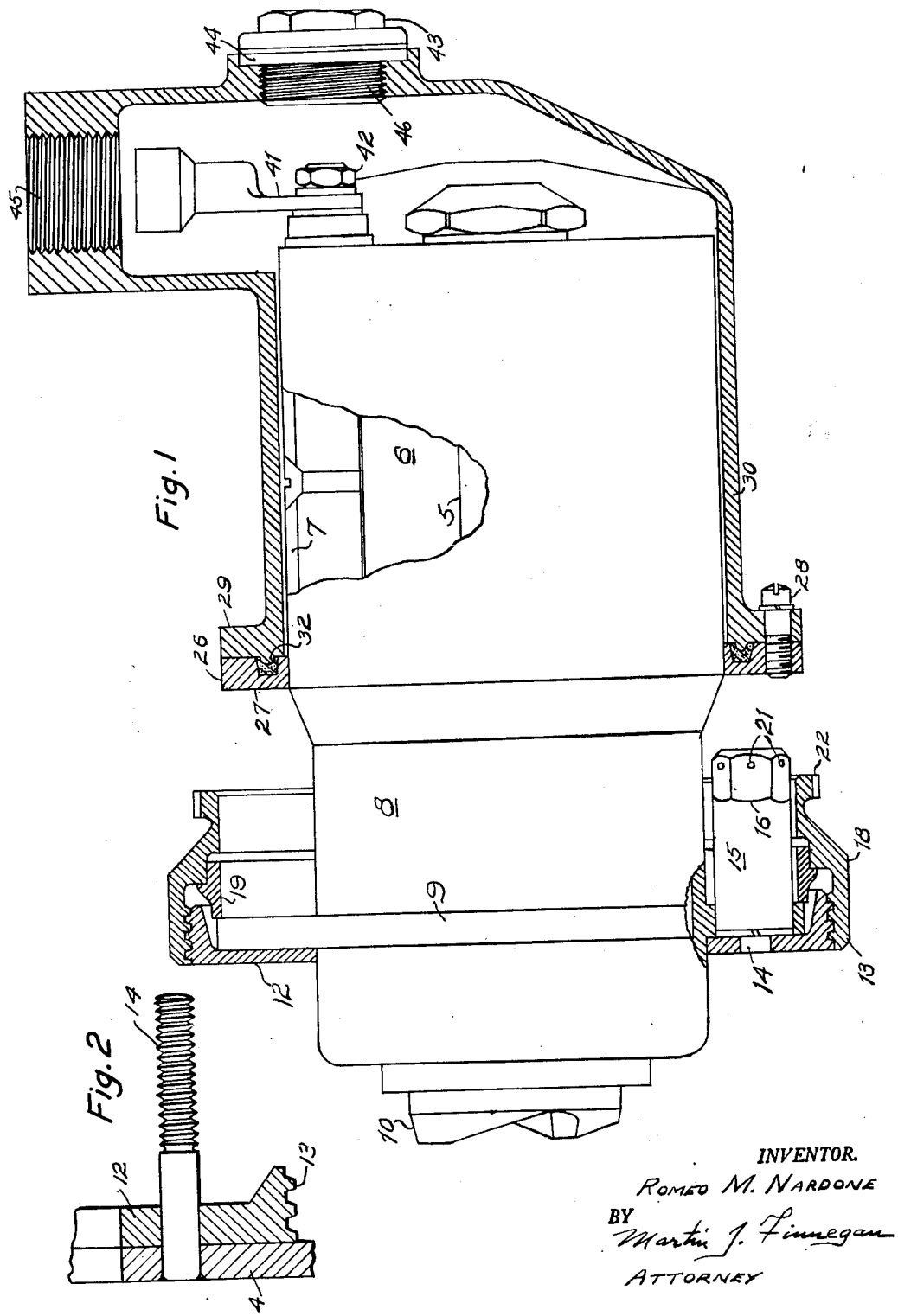
INVENTOR.
ROMEO M. NARDONE
BY
Martin J. Finnegan
ATTORNEY Patented July 4, 1950

2,513,734

UNITED STATES PATENT OFFICE 2,513,734

ENGINE ACCESSORY

Romeo M. Nardone, Teaneck, N. J., assignor to
Joseph J. Mascuch, Maplewood, N. J.

Application August 5, 1946, Serial No. 688,526

3 Claims. (Cl. 248—2)

This invention relates to engine accessories, and particularly to the mounting and sealing of such accessories.

An objection of the invention is to provide a novel method of mounting a starter, generator, or other accessory, upon the supporting frame of the engine or vehicle carrying such accessory.

Another object is to provide a novel method of sealing a joint in such an accessory, or similar device.

Another object is to provide a novel combination of accessory and accessory support, involving novel structural relationships permitting one to be quickly attached to or detached from the other.

Yet another object is to provide a novel sealing assembly which is incorporated directly upon adjoining surfaces of an accessory housing.

The conventional method of mounting engine starters and generators, in aircraft power plant practice, is to provide mating flanges on the engine and accessory, each with a multiplicity of holes to receive through-bolts or machine-screws. To install such an accessory it is necessary, first, to align the two flanges, then insert the dozen or more mounting bolts or screws, and then tighten each in succession. This tedious procedure must be repeated, in reverse sequence, every time the accessory is removed for inspection or repair.

The present invention eliminates the tedious procedure above described, and substitutes a much simpler procedure wherein all that is required is, first, the lifting of the accessory into a position of alignment with the mounting surface of the engine or support, and then the turning up of a single enveloping annular clamping element; the performance of this single tightening act being sufficient to secure the accessory with an even greater degree of stability than was attainable by the old procedure above described.

Another feature of the novel mounting means of the present invention is the establishment of such a relationship of parts as to cause the torque reaction to be absorbed by a series of relatively wide, long, round-surfaced pins projecting through peripheral openings in a circumferential flange on the starter housing; such pins being internally threaded to long studs on the engine housing. By reason of the relatively large and long bearing surface areas thus provided, the result is a great reduction in the vibrational stresses that have heretofore been characteristic of the conventional types of threaded bolt or screw mountings. A further result is a saving in cost, both in labor expense and in the elimination of much of the breakage and spoilage that inevitably accompanied the prior art practices.

A further feature of the novel sealing structure of this invention is that it lends itself readily to use on an accessory housing of the quick-disconnect type above described. Another important advantage is the confinement of the sealing action to a single annular region of very narrow width and volume, thus making possible the application of a strong sealing pressure per unit of area, with a relatively slight total pressure effort.

Figure 1 is a cross sectional view of the invention, and Figure 2 is an enlarged view of the bolt and securing means.

These and other objects and features of the invention will be understood upon examination of the following description of the embodiment of the invention illustrated in the accompanying drawing, wherein reference character 5 designates the driving shaft and 6 the driven jaw or clutch element of an engine starting unit adapted to impart initial rotation to the main drive-shaft (not shown) of the engine to be started; the shaft 5 being a part of the armature portion 6 of the starter motor. The field frame 7 of the motor has an integral extension 8 whose outer flange 9 constitutes part of the novel, quick-disconnection mounting means of the present invention, and said extension 8 also serves as the base of attachment for the novel sealing means of the invention, as well as being the reaction element of the torque multiplying gear train enclosed there-within; the details of such gear train being omitted as they are well known and form no part of the present invention.

The novel mounting means, as shown, includes a flat, round plate 12 having a circular rim 13 on which is machined a coarse thread for a purpose presently to appear. This plate 12 is a part of the engine housing. At spaced intervals, and at points equally distant from the central axis, studs 14 project from the engine flange through plate 12, each stud having a relatively long cylindrical surface, threaded throughout, to receive one of the internally threaded nuts 15, these being the nuts above referred to. Except for the end portion 16, which is provided with flat surfaces to receive a wrench for original installation purposes, each nut 15 is smoothly cylindrical along its outer surface, thus providing good bearing surface for engagement with the holes in flange 9 heretofore described. At the same time, the relatively long extent of the threaded connections between nuts 15 and studs 14 assures wide distribution of the torque reaction that develops during the starting cycle; the surface area over which the torque reaction is distributed being several times greater than in flange mountings of the types commonly used heretofore.

It will be understood that plate 12, studs 14, and nuts 15 are permanently installed parts of the engine housing. Now, then, whenever it is desired to install (or remove) the starter unit, all that is necessary is to tighten (or loosen, as the case may be) a single threaded connection, namely, the threaded connection between the enveloping clamping ring 18 and the rim 13 of plate 12; the ring 18 having an annular insert 19 which abuts and thereby retains against displacement the flange 9 when the ring is screwed up in fully-on position.

Of course, while ring 18 is being threaded to (or unthreaded from) the rim 13, the starter flange 9 will rest upon, and be supported by, the series of nuts 15 which serve as locating pins as the starter is raised into mounting position.

After fully tightening the ring 18, there may be added a tie-wire, or the like, to resist any tendency toward undesired un-threading. Such a tie-wire may extend from the holes 21, in one or more of the pins 15, to a similar hole or holes drilled through splines 22 along the rear section of ring 18.

The novel sealing means for the starter (which is of course applicable to other accessories as well) includes a flat ring 26 pressed onto, and copper-brazed upon, the outer surface of motor housing section 7, and a compressible sealing strip 27 fitting into the groove cut around the ring 26, along one side thereof, about midway between the inner edge and the holes which receive the connecting screws 28; the latter passing through the flange 29 of the outer sleeve 30 which envelopes the field frame 7 of the starter motor.

On the flange 29 of the sleeve 30, there is formed a circular head 32, the position of which is such as to cause it to register with the compressible circular strip 27 in ring 26, when the parts are assembled. Tightening of screws 28 will cause the head 32 to press into the center of the strip, thereby deforming the latter sufficiently to spread it into all gaps that may exist between the mating surfaces of the engaging parts. In this manner a fluid-tight seal is established, inhibiting the entry of sea-water, rain-water, or other moisture.

Outer housing 30 has an opening 40 to permit the installation of a terminal 41 and the securing thereof by a nut 42. This opening is closed off by outer nut 43 and gasket 44. A second opening 45 allows entry of the terminal cable, and can be closed off by a gland nut, to complete the sealing of the unit.

In the practice of my invention it is expected that there will be considerable variation from the precise forms and details herein illustrated, yet without departing from the scope of the invention as disclosed; also that certain features thereof may be used independently of, as well as in conjunction with, certain others. The appended claims are therefore to be read in the light of these explanations of its scope.

What is claimed is:

1. In an engine accessory mounting means, a peripherally threaded plate bearing projecting studs, said plate being integrated with said engine, an accessory flange having openings fitting around said studs, and a clamping element having a threaded portion for registry with said plate.

2. In a device of the character described, a supporting plate having a peripheral rim, a work unit having a flange fitting within said rim, and means engageable with said rim for the purpose of clamping said flange to said plate.

3. In a device of the character described, a supporting plate having bearing elements projecting therefrom, a work unit engageable with said bearing elements, and means attachable to said supporting plate for the purpose of clamping said work unit thereto, said means comprising an annular member having one portion thereof for fastening to said plate, and a second portion adapted to over-lie said work unit to an extent sufficient to prevent relative movement between said work unit and supporting plate.

ROMEO M. NARDONE.

REFERENCES CITED

The following references are of record in the file of this patent:

UNITED STATES PATENTS

| Number | Name | Date |
|---|---|---|
| 1,517,101 | Borger | Nov. 25, 1924 |
| 2,274,439 | Tinker | Feb. 24, 1942 |
| 2,368,537 | Gilbert | Jan. 30, 1945 |